United States Patent [19]

Tabor

[11] 4,007,892
[45] Feb. 15, 1977

[54] AIRCRAFT FLIGHT METHOD AND APPARATUS FOR BOOSTING AN AIRCRAFT TO A VERY HIGH ALTITUDE AND THEREAFTER BOOSTING THE AIRCRAFT TO A HIGH RATE OF FORWARD SPEED

[76] Inventor: Alga M. Tabor, 907 Darlene Lane, Arlington, Tex. 76010

[22] Filed: Jan. 24, 1975

[21] Appl. No.: 543,777

Related U.S. Application Data

[63] Continuation-in-part of Ser. No. 163,061, July 15, 1971, abandoned, which is a continuation-in-part of Ser. No. 833,893, June 12, 1969.

[52] U.S. Cl. .......................... 244/62; 60/39.16 S; 60/39.52; 60/258; 60/261; 60/262; 244/2; 244/59
[51] Int. Cl.[2] ........................................ B64D 33/00
[58] Field of Search ............. 244/62, 60, 15, 2, 58, 244/59, 53; 60/244, 39.16 S, 39.28 P, 39.52, 258-262; 416/25, 26

[56] References Cited
UNITED STATES PATENTS

| | | | |
|---|---|---|---|
| 1,461,700 | 7/1923 | Nichols | 244/60 X |
| 2,452,281 | 10/1948 | Zimmerman | 244/60 |
| 2,613,749 | 10/1952 | Price | 244/60 X |
| 2,633,698 | 4/1953 | Nettel | 60/39.52 X |
| 2,665,082 | 1/1954 | Anderson | 244/62 X |
| 2,713,243 | 7/1955 | Seaver | 244/15 X |
| 3,528,250 | 9/1970 | Johnson | 60/262 X |
| 3,702,688 | 11/1972 | Faget | 244/2 X |
| 3,731,483 | 5/1973 | Hill | 60/39.16 S |
| 3,739,575 | 6/1973 | Falk | 60/39.52 X |
| 3,792,584 | 2/1974 | Klees | 60/262 X |
| 3,851,463 | 12/1974 | Robinson | 60/39.28 P |
| 3,854,286 | 12/1974 | Klees | 60/262 X |

OTHER PUBLICATIONS

Pratt & Whitney Aircraft: "The Aircraft Gas Turbine Engine and its Operation." part No. PWA 182,408, June 52–Aug. 1970, pp. 13–23, 210.

*Primary Examiner*—Stephen G. Kunin

[57] ABSTRACT

This invention relates to a method and apparatus whereby functioning airborne conventional aircraft and engine combinations may be assisted during flight in attaining above normal airspeeds and/or altitudes; for the purpose of improving their performance during flight. In the method steps, well known apparatus elements, and/or new and useful combinations thereof, are utilized to enable such aircraft to achieve flight advantages, and improved flight performance, not believed to be possible prior to this invention. According to the method, booster apparatus is used initially in acquiring altitude, forward momentum of the aircraft, rotational momentum of its rotor airfoils, and the like. Apparatus used includes oxygen booster systems. Such systems can include forward thrust rockets, rotational boosters, and apparatus for injecting a supplemental oxidizer into a gas turbine engine afterburner. Other apparatus includes ram pressure air inlet systems, variable speed drive and rotor airfoil combinations, waste gate type variable flow volume bypass apparatus for selectively bypassing portions of main combustion chamber exhaust gases around the engine exhaust gas driven turbine instead of through it, related devices, and combinations thereof.

26 Claims, 9 Drawing Figures

AIRCRAFT FLIGHT METHOD AND APPARATUS FOR BOOSTING AN AIRCRAFT TO A VERY HIGH ALTITUDE AND THEREAFTER BOOSTING THE AIRCRAFT TO A HIGH RATE OF FORWARD SPEED

CROSS REFERENCE TO RELATED APPLICATIONS

This application is a continuation-in-part of my pending application Ser. No. 163,061, filed July 15, 1971, now abandoned; which, in turn, was a continuation-in-part application of my co-pending application Ser. No. 833,893, filed June 12, 1969.

SUMMARY OF INVENTION

My invention relates to a method and means for improving the utility and performance of military and civil aircraft; which are powered by air breathing engines whose thrust during flight is dependent upon the function of rotating rotor airfoils appurtenant to said engines. More particularly, my invention relates to a novel method and means for more advantageous utilization of atmospheric air and mechanical devices in overcoming undesirable inertial effects relating to forward and angular momentum in flying such aircraft.

Many uses, objects, and advantages of my invention will become apparent, especially to those skilled in the arts involved, during the course of this disclosure. No predetermined degree of utility is intended as an object or purpose of the said invention; and it is not contemplated that every type of aircraft would be suitable for the practice of all of its embodiments. It should also be noted that some of the devices disclosed herein, which are directly coacting elements of combinations comprising embodiments of this invention, may also have secondary and potentially independent novelty and utility; although the purpose and result of such secondary novelty and utility would also be to improve the utility of military and civil aircraft. Methods and details of aircraft take-off and landings are not a part of my invention per se.

The method form of my invention includes the use of various general embodiment types. In one embodiment, for example, oxygen booster system means is utilized to launch or boost suitable turbojet or turbofan engine powered aircraft into full forward speed at altitudes significantly higher than the normal operational flight altitude ranges of such aircraft; the object or purpose therefor being the novel and advantageous utilization of applicable aerodynamic phenomena in improving the flight performance of such aircraft at the said higher altitudes. Included in said phenomena is the fact that reduced air density, and the resulting decreased aerodynamic drag, permits higher aircraft airspeeds, without corresponding increases in aircraft power plant thrust, as flight altitude is increased. Further, the thrust efficiency of axial flow turbojet and turbofan engines tends to increase as forward airspeed increases, the thrust augmentation effects of ram air tend to increase, as forward airspeed increases and aircraft wing lift, at a given angle of attack, increases as forward airspeed increases.

In another embodiment of the method form of my invention, controllable variable speed means are utilized to vary the relative rotational velocity of aircraft rotor airfoils. The object or purpose therefor is to improve the flight performance of aircraft by increasing the relative utility of its rotor airfoils. For example, the thrust of air screw and propeller type rotor airfoils decreases at high forward speeds; and the rotor airfoil thrust loss due to high forward airspeeds can be regained, at such high forward airspeeds, by increasing the relative rotational velocity of said airfoils without overloading the driving means therefor. When the relative rotational velocity of such airscrew type rotor airfoils has been increased at high forward airspeed, it must again be decreased to prevent overloading of the driving means therefor when forward airspeed is again reduced.

Still another embodiment of the method form of my invention relates to the utilization, in combination, of both oxygen booster system means and variable relative rotational velocity rotor airfoils; which will be described in greater detail in the course of this disclosure.

My invention also includes some suitable means, comprising various combinations of aircraft mechanisms, for accomplishing flight according to the methods above outlined.

Certain terms used in the specification are defined as follows:

The term "normal operational altitude range", sometimes hereinafter referred to as "normal altitude", as herein intended refers to the altitude range (sometimes referred to as normal cruising altitude) at which a given aircraft has been found to perform best in flights of extended duration. Such altitudes can vary because of differences in "pay load" and/or fuel weight; and are usually recommended by the aircraft manufacturer. Examples of such operational flight altitudes include 20,000 feet for piston engine transport aircraft, about 30,000 feet altitude for turboprop transport aircraft, and around 35,000 feet altitude for many turbojet and turbofan powered aircraft. The normal speed ranges of an aircraft are rated by the manufacturer and are routinely understood in the aviation and aircraft arts. Inasmuch as I anticipate that the use of my invention will change various performance limits, it is therefore to be understood, for the purpose of this disclosure, that references herein to "normal" altitude and speed limitations refer to what those limits would be or would have been without the use of my invention.

The term "above normal altitude" is understood to mean an altitude significantly higher than the normal operational altitude range as above defined.

The term "flight in the standard and conventional manner" refers to flight methods that have been standard practice for more than a half century; and do not include the method and means of this invention.

The term "full forward speed" is understood to mean an airspeed high enough to enable the aircraft to support itself in generally level horizontal flight at a given altitude, and/or to forward airspeed sufficiently high so that the use of a variable speed drive means to increase the rotational speed of rotor airfoils of an aircraft, relative to the rotational speed of the primary driving means for said rotor airfoils, will not then tend to impose a continuous and sustained torque power overload upon said engine.

The term "wherein the aircraft is adapted for and provided with suitable variable speed drive means for controlling the relative rotational speeds of its rotor airfoils", as herein defined and intended, means that the propulsion system of the aircraft includes suitable torque overload compensation means, for overcoming and/or averting the momentary torque overload that would normally be encountered in flight while using the said variable speed drive means to step up the relative rotational speed ratio of its rotor airfoils. Examples of such conventional type torque overload compensation means adaptations, as disclosed herein, include rotational boosters, variable closure or variable geometry air inlets, jet engine variable turbine bypass means, clutch type disconnect means for achieving high speed and no load windmilling of rotor airfoils during their relative rotational speed ratio step up during high speed flight, rotary inertial means on the power input side of a variable speed drive unit, and/or any, or any combination, of such torque overload compensation adaptations. The type of torque overload compensation adaptation utilized would depend on the design requirements of a given aircraft and engine combination.

An "oxygen booster system" as herein defined and intended would provide, or be provided with, a supplemental supply of oxygen or oxidant in the performance of its useful function. A rocket assist device, for example, can function as an oxygen booster system in that it is provided with its own oxidant supply that is not derived from the in flight intake of ambient air. As further envisaged herein, a separate aircraft or flying vehicle, whose thrust is provided or augmented by oxygen booster means, can also function as an oxygen booster system; if it is provided with means for attachment to, and imparting additional forward acceleration to, a second aircraft during flight. According to my invention, the separate vehicle type of oxygen booster system may comprise a considerable variety of possible embodiments. The use of a large rocket powered flying aircraft carrier to boost a conventional aircraft to a higher altitude and/or forward speed than the said conventional aircraft could reach without such booster assistance. Another such embodiment can comprise a large rocket powered in-flight refueling aircraft which is equipped with a retractable L-shaped refueling probe capable of serving as a tow bar after it engages and locks into the refueling receptacle. A single booster aircraft could therefore rendezvous in flight with a group of fighter aircraft, for example, and assist them in reaching higher altitudes and/or forward speeds than the said fighter aircraft could attain in conventional flight under their own power. Advantages of the separate airborne vehicle type of oxygen booster system include the fact that the assisted aircraft are not burdened with the weight of the booster system. The mechanical means available for attaching a booster vehicle to, and detaching a booster vehicle from, an assisted aircraft are so many and varied that no particular purpose would be served in setting them forth and showing them in detail herein. One suitable type of impact coupling has been used by the railroads for more than 100 years. An afterburner having means for injecting oxygen or an oxidant into the afterburner fuel combustion mixture may function as an oxygen booster system.

The term "oxygen booster system" also includes rotational boosters. FIGS. 3 and 4 of the drawings are examples. The possible examples of rotation, or rotary, oxygen booster systems are many and varied; and include conventional type rocket pinwheels, reaction and/or cartridge type aircraft engine starters, and similar old and well known devices.

Conventional afterburners, turbosuperchargers, and ramjet devices, whose oxidant supply is derived solely from the continuous intake of atmospheric air during flight are not oxygen booster systems as herein referred to.

BACKGROUND OF THE INVENTION

The following table of aerodynamic phenomena and the basic equations relating thereto were the result of innumerable wind tunnel tests and were compiled by the Civil Aeronautics Administration in cooperation with the American Council on Education in 1947.

| FACTOR | LIFT | DRAG |
| --- | --- | --- |
| Area of Lift Surface | Varies Directly | Varies Directly |
| Density of Air | Varies Directly | Varies Directly |
| Angle of Attack | Varies Proportionally, up to stalling point | Varies Proportionally |
| Velocity | Varies as the Square | Varies as the Square |

Equation 1. $L = \frac{Cl\, D}{2} SV^2$

Equation 2. $D = \frac{Cd\, D}{2} SV^2$

Equation 3. $F = MA$

DRAWINGS

The following drawings are illustrative of certain aspects of the invention as described in the following specification.

It is to be expressly understood that the drawings shown herein are diagrammatic and illustrative examples only; and are not intended to define the limits of my invention. It is intended that the scope of my invention may be derived from the reading of the claims, description, and drawings together.

Figure 8:
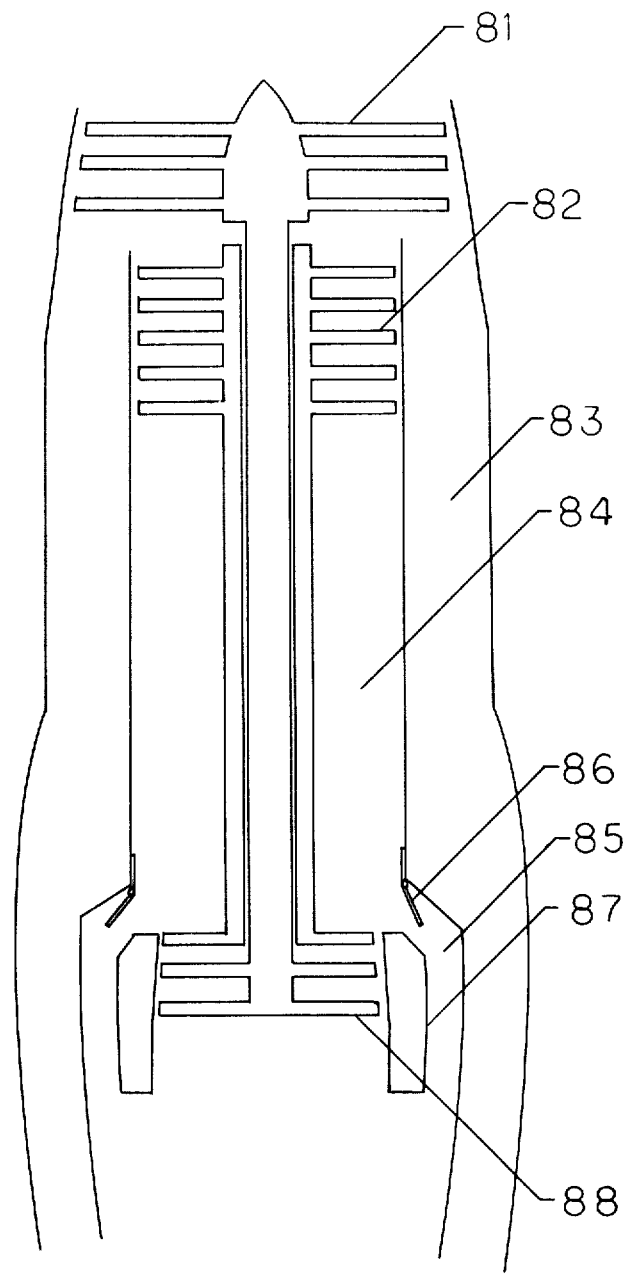

FIG. 8 of the drawings is a diagram of a turbofan (bypass) engine whose purpose is to disclose the functional principles of a waste gate type variable flow volume turbine bypass means; for selectively bypassing portions of the hot exhaust gases exiting from the engine combustion chamber, or chambers, around the engine turbine instead of through it.

During flight, ram air enters the engine air inlet and passes through the forward fan 81 as shown in FIG. 8. A part of this air intake flows into and through the engine compressor 82. Another part of said intake air passes into an annular bypass duct 83 and normally does not enter the turbojet portion (compressor 82, combustion area 84, and turbine 88) of the engine.

It is well known that the engine turbines of present day airline jets will be damaged if their engines are operated at full throttle for more than 3 minutes because of turbine overheating. The waste gate type variable flow volume bypass valving means 86, utilizing suitable and well known heat sensor controls, can help to solve this turbine overheating problem by bleeding off hot gases from the combustion area 84, that would otherwise have to pass through the turbine 88, and allowing excess amounts of the said hot gases to bypass around said turbine 88 and flow through bypass ducting 85; the inner wall of said ducting 87 serving as a heat shield between the said excess hot gases and the turbine 88.

DESCRIPTION OF THE PREFERRED EMBODIMENTS OF MY INVENTION

FIG. 1

Figure 1:
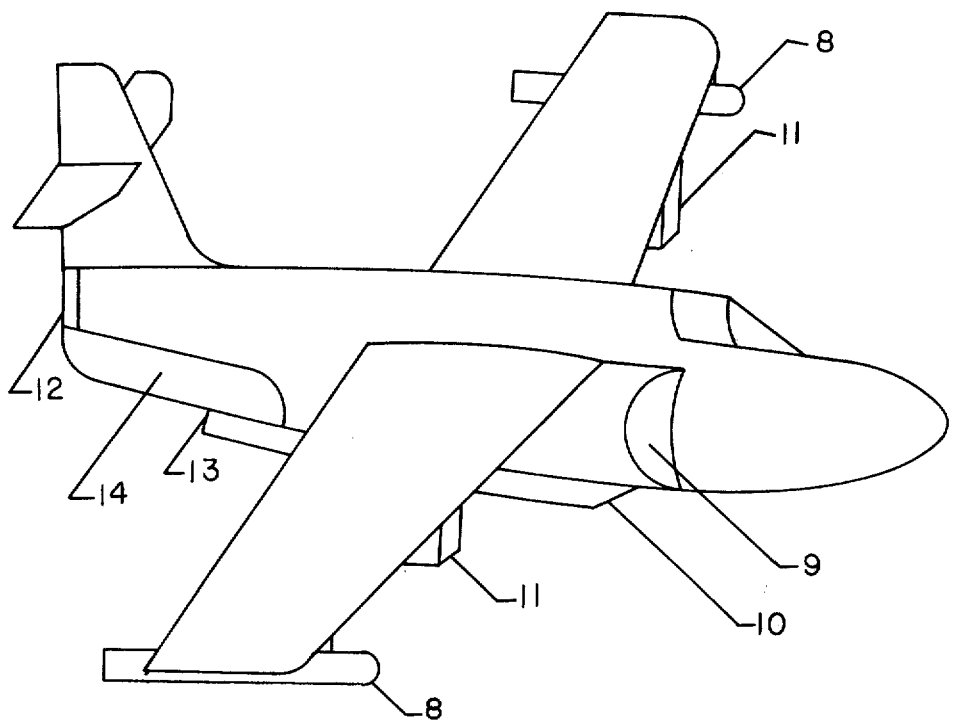
FIG. 1 is a diagrammatic view of an aircraft powered by an axial flow turbo jet engine.

FIG. 1 of the drawing may be envisaged as a diagrammatic view of an aircraft powered by an axial flow turbojet engine, with afterburner, and provided with attached means for oxygen booster system thrust assistance. The rocket boosters 8 are attached to outer wing bomb rack pylons of the aircraft. Such oxygen booster systems can comprise liquid fuel rocket engines, paired solid fuel rockets, or paired clusters of solid fuel (mono-propellant) rockets. Obviously, in the interest of flight stability, when booster thrust is applied to the outer wing sections of such an aircraft the thrust force applied to both wings would need to be equal and simultaneous. One of the many possible devices for insuring equality of the application of booster thrust to both wings of such an aircraft would be, for example, to include the ignition means of a rocket booster attached to one wing in an in series electrical circuit with the ignition means of an identical rocket booster attached to a corresponding part of the opposite wing; so that it would be impossible to start one of such a pair of attached boosters without starting the other; and the burn times of identical solid fuel rocket boosters would, of course, be equal. The burn time of liquid fuel rocket boosters can also be controlled and/or limited by the shutting off of fuel and oxidant flow to the rocket combustion chambers. Such oxygen booster systems can also be attached instead to inboard Wing Weapons Rack pylons 11; but in regard to some current attack aircraft types, this would cause the rocket exhaust flame to heat up the horizontal stabilizer of the aircraft tail section; thereby creating requirements for additional heat shielding.

It is readily feasible, by suitable means, to inject oxygen or an oxidant into the engine air inlets 9 of such an aircraft but this is subject to the limitation that such aircraft engines tend to operate at temperatures not far below the allowable maximum; and the aircraft engine combustion chamber temperature tends to be determined by the percentage rather than the volume of oxygen in the fuel combustion mixture. Although it is readily possible to preserve the walls of overheated combustion chambers by surrounding them with coils of incoming fuel and/or oxidant, it would not thereby the possible to prevent certain aircraft engine internal moving parts from being ruined by extreme overheating. For example, current technology means for cooling aircraft engine exhaust turbines would be inadequate if combustion chamber temperatures were raised very substantially. Suitable oxidants for injection into the air inlets of aircraft engines could include liquid air or hydrogen peroxide.

The rocket type oxygen booster system 10, which is shown attached to the ventral section of the depicted aircraft, shown with exhaust nozzles 13 and flame shield 14, may be envisaged either as a liquid fuel rocket engine assemblage or as a group of controllable solid fuel rockets. In the years that followed World War Two, rocket assist means became commercially available in almost any desired type, configuration, and thrust power. The said devices were used in assisting the take off of heavily loaded aircraft. After jet powered aircraft began to dominate the air transport field, the manufacture of such oxygen boosters was gradually discontinued because it was believed that the more powerful jet powered aircraft did not need them.

The afterburner section 12 of the aircraft depicted in FIG. 1 can include a convergent-divergent exhaust nozzle (not shown) and means (not shown) aft of the turbojet turbine for injecting oxygen or an oxidant into the afterburner fuel combustion mixture. Afterburner use approximately doubles the fuel consumption per second of an aircraft but the use of afterburners in climbing an aircraft saves fuel because the added thrust enables the aircraft to reach a high altitude in a much shorter period of time. An important advantage of injecting supplemental oxygen or oxidant into the afterburner fuel combustion mixture relates to the fact that the conventional afterburner tends to flame out at about 60,000 feet altitude during a zoom climb. The afterburner injection type of oxygen booster system has the advantage also of bypassing and avoiding overheating of the main engine and turbine; and that the oxidant injection flow rate, and thereby the oxygen percentage and temperature of the afterburner combustion mixture, can readily be regulated by the use of thermo-couple and altitude sensors. Afterburner and/or afterburner nozzle temperature can also be mitigated by circulating the flow, by suitable means, of the incoming fuel and/or oxidant around the heated walls thereof. Suitable means that could be used for the injection of oxidants or oxidizers into an afterburner are common and well known in the art; and could include pumps, tubing valves and injection nozzles, and the like.

FIG. 2

Figure 2:
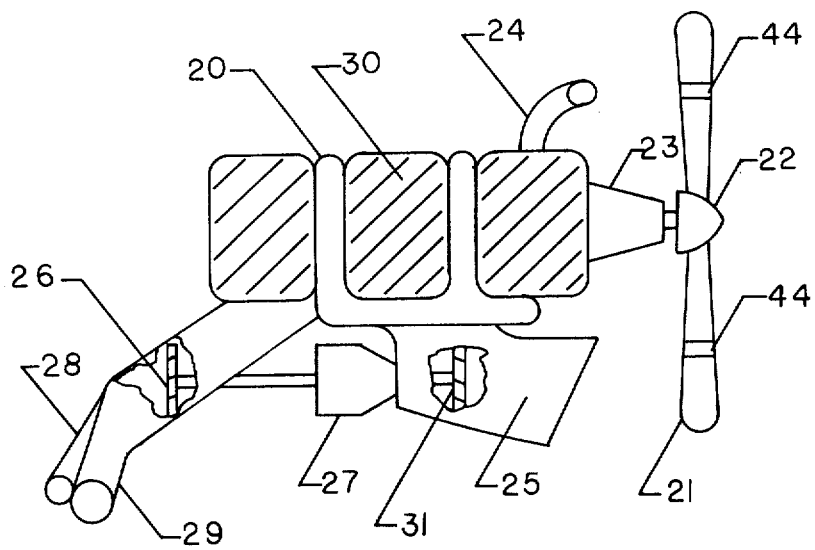
FIG. 2 is a diagrammatic view of an aircraft power plant consisting of an internal combustion engine, including a turbosupercharger for driving a propeller.

FIG. 2 may be envisaged as a diagrammatic view of an aircraft engine 30 which derives thrust from a propeller; and whose air intake can be augmented by the air blast from its propeller. The partial diagrammatic representation comprising FIG. 2 depicts an in line 6 cylinder opposed piston type engine but other embodiments of this form of my invention are contemplated; including the use of radial reciprocating, underscoop turboprop, and helicopter engines in various methods and combinations.

In the embodiment shown, the propeller blades 21 are attached mechanically to a rotary hub assembly inside the propeller cone 22 which encloses means for controlling the degree of pitch of the propeller. Rotational torque force and momentum are transmitted from the depicted engine to the propeller assemblage by a controllable variable speed drive means 23 interposed between, and joining together mechanically, the engine propeller driving means and the propeller assemblage. The low altitude engine air inlet 24 is provided with suitable check valving or shutoff means (not shown) so the engine air intake manifold 20 air pressure will not leak out through the low altitude air inlet when the turbosupercharger is in operation at high altitude. The turbosupercharger ram air inlet scoop 25 may be provided with suitable closure means (not shown) for isolating the turbosupercharger system when it is not being operated. Such closure means could include single or multiple butterfly valving, pivoted inlet and shut off vanes, and the like. Such controllable closure means are well known in the art, and would normally be variable and/or selective. Also, in the embodiment shown in FIG. 2, rotational torque momentum is transmitted from the exhaust turbine 26 to the turbosupercharger air intake rotor airfoils 31 by a controllable variable speed drive means 27 having, in combination therewith, flywheel type rotational energy storage means. The stored rotational momentum energy can be helpful in insuring that the exhaust turbine 26 will not stall while the rotational velocity of the turbosupercharger air intake rotor airfoils 31 is being increased relative to the rotational velocity of the said exhaust turbine. At intermediate altitudes, the rotational velocity of the turbosupercharger air intake impeller, and thereby the engine air intake manifold pressure, is normally regulated by a controllable waste gate valve (not shown) whereby required or selected portions of the engine exhaust gas volume are bypassed around the exhaust turbine and discharged through an alternate outlet 28 instead of being discharged through the turbine outlet 29. In the course of a continuing upward climb during flight, an altitude will eventually be reached at which the air intake manifold pressure of the depicted engine would be within the normal range with the aforesaid waste gate bypass valve completely closed. At that point it would become advantageous to return the aircraft to horizontal flight, make use of the variable speed drive assemblage 27 to increase the rotational velocity of the turbosupercharger air intake rotor airfoil 31 relative to the rotational velocity of the turbosupercharger exhaust turbine 26, and to correspondingly reopen the turbosupercharger exhaust turbine waste gate bypass to the extent that the engine air intake manifold stays within normal limits. After sufficient forward speed in horizontal flight is attained, the upward climb may again be resumed if desired.

The inertial energy storage means of the device 27 of the said turbosupercharger system would, obviously, need to function on the turbine side of the variable speed drive; because of moment of inertia considerations. Inasmuch as the mechanical and physical principles of the turbosupercharger combinations such as the one shown in FIG. 2 are directly analogous to those of a gas turbine engine that delivers power to its rotor airfoils through variable speed drive means, it is therefore advantageous to provide such turbosupercharger combinations with like torque overload compensation adaptations; such as rotational boosters, variable closure inlets, and the like. An embodiment of the common and well known cartridge type starter device could obviously serve as a rotational booster and function as the required turbosupercharger torque overload adaptation.

The ram air inlet of the embodiment depicted in FIG. 2 is directly behind and aerodynamically downstream from the faster moving portions, near the outer tips, of the blades of the propeller 21. The novel interrelating arrangement, and combination, comprising the propeller, the propeller cone and hub assembly 22, the engine to propeller variable speed drive means 23, and the ram air inlet 25 serves the purpose of augmenting the air supply to the ram air inlet assembly. For example, engine ram air intake tends to increase as the forward speed of an aircraft, and thereby the relative speed of the ram air entering its engine air inlet, increases. Inasmuch as the velocity of the air blast from a propeller, or other air screw type rotor airfoil, normally has to exceed the forward speed of its aircraft in order to produce thrust, it therefore, as herein envisaged, becomes advantageous to align the engine ram air inlet directly in the path of the most energetic part of the propeller air blast; so that the relative engine ram air intake velocity, and therefore the useful volume and pressure thereof, are thereby increased. In addition, my experiments have shown that the suction created by a rapidly rotating air screw type rotor airfoil will draw a converging mass of air, from all directions ahead and abreast of the rotating airfoil, through the rotational radius of the said rotor airfoil. This converging airflow phenomenom can readily be verified by holding a 2 by 6 inch strip of writing paper at various points near the outer edges, and on the upstream side, of an ordinary electric fan. The result of this converging air mass phenomenon is that the effective or working density of the air immediately behind and downstream from a functioning propeller, or other air screw type rotor airfoil, becomes substantially greater than the density of the surrounding ambient air.

In the operation of this engine ram air supply augmentation system element of my invention, various sensors, such as pitot and pressure sensitive devices for example, would be utilized in monitoring the air supply entering the engine inlet or inlets. When the engine air inlet mass flow approaches the allowable minimum with the propeller 21 at full pitch, the variable speed drive means 23 is used to speed up the rotational velocity of the propeller relative to the rotational velocity of the engine driving means therefor. During such a change of relative rotational velocities it is preferable that propeller pitch be reduced; and immediately thereafter that the said propeller pitch be readjusted so that the torque load upon the engine, and the degree of augmentation of the air supply into the engine air inlet, are optimal. With an optimal air supply entering the engine and when other factors such as R.P.M., air density, and forward speed are constant I found that decreasing the blade pitch angle of air screw type airfoil devices decreased both the thrust produced by such devices and the engine power required to drive them; and that increasing the blade pitch angle, within the usual 0° to 45° adjustment range, increased both the thrust produced by such devices and the engine power required to drive them. The same principles also apply to air screw type rotor airfoil R.P.M. As diagrammed in FIG. 2 for example, when the variable speed drive means 23 is used to speed up the relative rotational velocity of the propeller 21 in order to regain the thrust and engine air inlet mass flow volume lost because of the thin air at very high altitude, no significantly greater engine power is required to rotate the propeller at the higher altitude and rotational speed because correspondingly less power is required to rotate such an airfoil in thin air than in dense air. Likewise the said variable speed drive means 23 can be utilized to compensate for the decrease in propeller thrust at high forward speed by increasing the relative rotational speed of the said propeller at the high forward speed. The power required to rotate the said propeller decreases correspondingly as its forward air speed increases.

In FIG. 2, novel turbosupercharger and novel propeller air blast engine performance augmentation means are depicted as aligned and coacting together in series.

Either of the two mechanical systems can, however, function independently of the augmentation effects of the other; and many variations thereof are possible without departing from the scope of my invention. In one variation, minus the turbosupercharger means, FIG. 2 could comprise a schematic representation of an underscoop type turboprop engine whose performance and inlet air supply are augmented by the air blast from its propeller; as hereinbefore described. In a helicopter gas turbine engine variation, for example, the engine air inlet could be located topside the fuselage and the length of the engine behind the power take off and variable speed driving means for the air screw type main helicopter rotor.

Figure 3:
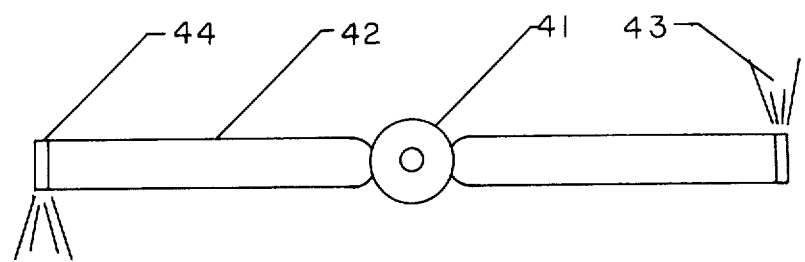
FIGS. 3 and 4 are diagrammatic views of rotor airfoils, in the form of propellers or helicopter rotor blades carrying rotational boosters.
Figure 4:
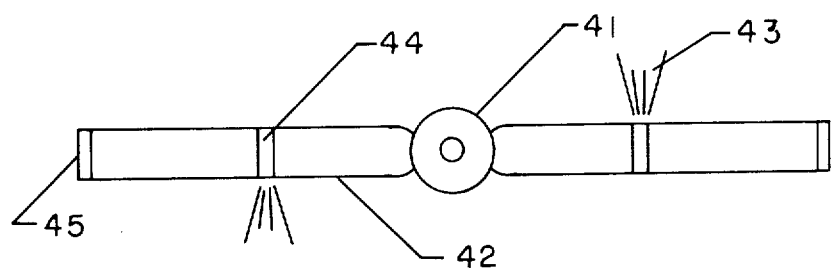

FIGS. 3 and 4

FIG. 3 and FIG. 4 depict diagrammatic representations of rotor airfoil and/or air screw type oxygen booster systems. The hub assemblage 41 comprises the central axis of rotation of the airfoil blades 42. The rocket exhaust gases 43 from the small booster rockets 44 act to assist and accelerate the rotor airfoils in their rotation. Such booster assistance is advantageous when variable speed drives are being used to step up gear ratios, or relative rotational velocities, of rotor airfoils. In the practice of my invention I also anticipate that rotor airfoils will be rotated at supersonic speeds and it therefore becomes useful to accelerate them through the vibratory transonic rotational speed range as rapidly as possible. The tip fence 45 depicted in FIG. 4 can be useful in reducing outwash and flutter; especially in regard to helicopter rotor blades at high altitude and rotational velocity. Rotor airfoils, as herein defined and referred to, are airfoils that, in the performance of their useful function, move atmospheric gases or are rotated by atmospheric gases, as they rotate around a central axis. Examples thereof are aircraft propeller blades, helicopter rotor blades, aircraft jet engine compressor blades, aircraft jet engine turbine blades, fan blades, and windmill blades.

In the mechanical systems depicted in FIG. 3 and FIG. 4, the rotating booster engine 44 would preferably be utilized in combination with a variable speed drive means for transmitting power from the basic engine to the rotor airfoils 42, but the utility of the said booster means 44 would include advantages in addition to overcoming the inertia of the rotor airfoils during gear ratio step up. For example, the said boosters 44 could enable the rotor airfoils to operate at a higher pitch angle and/or rotational velocity, by assisting the main driving engine and increasing the power available to the rotor airfoils for producing thrust. The said boosters can also if desired, in combination with a primary engine and variable speed drive means, comprise small ramjets which may, or may not, function with the assistance of oxidant injection.

The possible design forms of rotational boosters are many and varied. In a gas turbine engine, as a single example, the reaction thruster outlets 43 can be conventionally mounted on, or behind, the engine turbine airfoils assemblage; so that rotational torque is transmitted to the forward compressor airfoils by a concentric shaft. Related heat problems, insofar as this invention is concerned, are mitigated by the fact that the said thrusters would only need to operate for very short periods of time; during rotor airfoil rotational speed ratio step up.

FIG. 5

Figure 5:
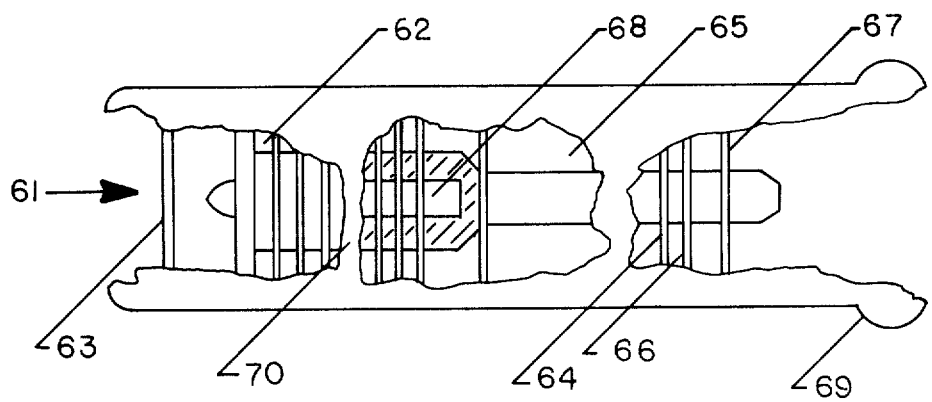
FIG. 5 is a diagrammatic view of an aircraft jet engine, partially broken away, illustrating variable speed drive means between the turbine and compressor rotors.

FIG. 5 is a diagrammatic representation of an embodiment of my invention comprising an aircraft jet engine in which a variable speed drive means is utilized to control and/or vary the rotational velocity of the depicted rotor airfoil assemblages with respect to each other and the engine as a whole. For example, under some conceivable flight conditions it might become advantageous if both compressor stages and the engine turbine should rotate at the same velocity; but, under other flight conditions it could become advantageous if all three assemblages rotated at different rotational speeds. In the embodiment shown, ram air enters the engine air inlet 61 and reaches the compressor stages 62 by passing through the inlet guide vanes 63. The variable angle of incidence stator airfoil blades of the compressor and turbine stages are assumed but not detailed in the diagram. Air from the compressor stages 62 reaches the upstream section of the turbine 64 after passing through the combustion chamber 65 and having gained energy from the combustion process therein. The combustion area can comprise a single cavity or the usual concentric cluster of burn cans. The turbine airfoil blade rotors 64 and 66 may rotate as a unit or they may comprise a twin spool arrangement. The injection unit 67 may inject fuel, oxidant, or both. In the embodiment shown, the variable speed drive means 68 is located inside the rotor drum of the second compressor stage. The exhaust thrust nozzle 69 is of the convergent-divergent supersonic type and may, or may not, be variable. The clutch means 70, not shown, could facilitate stepping up the gear ratio, or relative rotational velocity, of the forward compressor stage at high forward speeds. As intended herein, such a variable speed drive and/or clutch means could, if desired, by controlled in such a manner that any of the rotor airfoil assemblages may be disengaged and allowed to spin freely as determined by the ram air velocity, the stator airfoils may be pivoted to zero pitch, and discharge gases from the engine burn cans may be bypassed around the engine turbine in a manner analogous to the mechanical system of a turbosupercharger waste-gate bypass.

The compressor blade airfoils of a turbojet aircraft engine, for example, create a suction that pulls in a converging mass flow of air from all directions forward and abreast of the forward rims of the engine air inlet. Because of this converging mass air flow effect, bolts and other hardware lying on the pavement underneath a powerful turbojet engine have been sucked into the air intake of the said engine during ground engine run up; and people standing 3 or 4 feet to the side of the air inlet rim have been sucked into the air inlets of such engines when the said engines were running at full power. The momentum and density of the converging mass flow of air entering the air inlet of a functioning aircraft gas turbine engine, at a given air density and forward speed, is determined by the rotational velocity of the engine compressor rotor airfoil blades; subject of course to the internal mass airflow volume limitations of current technology engines. For example, as air density decreases with increasing altitude during flight, this decrease in air density may be compensated for by utilizing the variable speed drive means 68 to correspondingly increase the relative rotational velocity of the rotor airfoil blades of the forward engine air compressor stage. With proper use of the variable speed drive means 68, and allowing for any gear train friction and the initial energy required to overcome the inertia opposing rotational acceleration during "gear ratio" step up, the discovery now emerges that no more power is required to move or compress a given amount of air at high altitude than at sea level; the limiting factor being the strength of airfoil structural materials in relation to the effects of centrifugal force.

Figure 6:
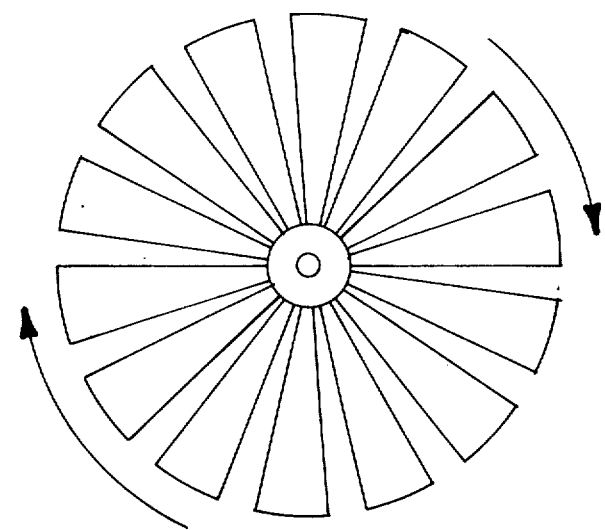
FIGS. 6 and 7 are diagrammatic views of rotor airfoil assemblies.
Figure 7:
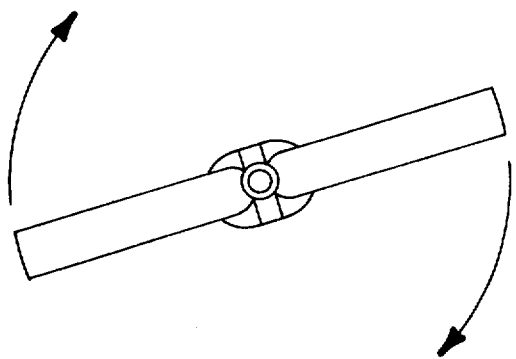
Figure 7A:
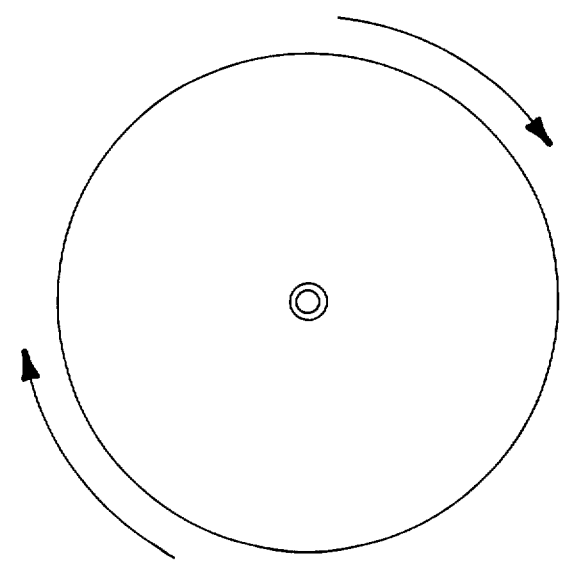
FIG. 7A is a representation of the assembly of FIG. 7 rotating at a higher rate of speed.

FIGS. 6, 7 and 7A

FIGS. 6, 7 and 7A comprise diagrammatic representations of two types of rotor airfoil assemblages which serve to illustrate certain aerodynamic functional principles that relate to my invention. The windmill configuration of rotor airfoil blades depicted in FIG. 6 may be envisaged, for the purpose of this disclosure, as the fan assemblage of a turbofan aircraft engine or as the forward compressor stage of a turbojet aircraft engine. The passage of a substantial mass flow of air through the rotational radius, and between the rotating airfoil blades, of the rotor airfoil assemblage depicted in FIG. 6 while it is functioning creates a dynamic interaction between the said mass air flow and the rotating rotor airfoil blades of the depicted rotor airfoil assemblage; that is not readily obvious or apparent. Let us assume, for example, that the depicted rotor airfoil assemblage is being driven and rotated at a given rotational velocity by engine power. If the aircraft is standing still, as during ground engine run up, the depicted rotor airfoil assemblage may function wholly as an air screw means for moving and/or compressing air. On the other hand, if suitable oxygen booster means is used during flight to overspeed the aircraft to a forward speed greater than the driven rotational velocity of the outer tips of the rotating rotor airfoil blades of the depicted rotor airfoil assemblage, the same depicted rotor airfoil assemblage will thereby be caused to function wholly as an airborne windmill or ram air turbine means. Between these two extremes, and during normal flight operations, the forward rotor airfoils of the ordinary airplane tend to function both as ram air turbines and as air screws at the same time. The reason for this dual and coacting function of rotor airfoils during normal operation derives from the fact that all parts of a rotor airfoil blade do not move with equal velocity when the rotor airfoil blade is rotating. A point on a propeller blade near its outer tip, for example, may travel a circular distance of 36 feet during a single revolution of such a rotor airfoil blade around its central axis of rotation; while during the same revolution a point near the hub of the same blade may only travel a circular distance of about 3 feet.

It would appear then that when a propeller driven aircraft is in level flight at 400 m.p.h., with its propeller blade tip speeds at 600 m.p.h., the outer one third of each propeller type rotor airfoil blade is functioning as air screw means while the inner two thirds is being windmilled or driven like a ram air turbine by oncoming ram air. Under such circumstances, and at high forward flight speeds, the amount of engine power required to rotate a propeller at a given blade pitch and r.p.m. decreases correspondingly as forward airspeed increases; and the effective thrust of the propeller means also decreases correspondingly. This situation can be compensated for somewhat by increasing rotor airfoil blade pitch as forward airspeed increases but a point is eventually reached when reasonable thrust efficiency can only be regained and maintained by increasing the relative rotational velocity of propeller and/or or other rotor airfoil means; which can be accomplished, for example, by utilization of variable speed drive means.

In addition, rotor airfoil blades functioning as air screw means may also be envisaged as rotating inclined planes which are in continuous collision with the air encountered in the course of their rotation; so that the result of the said continuous elastic collision is that air is hurled rearward and the aircraft tends to be thrust forward. As forward aircraft speed increases, at fixed blade pitch and without any proportional increase in relative rotor airfoil rotational velocity, the propulsive force of the aforesaid continuous elastic collision decreases correspondingly because the colliding rotor airfoil blades tend increasingly to be moving forward and away from the impact air in their rotational path as collision occurs. A like situation occurs as altitude is increased without corresponding increase in rotor airfoil blade rotational velocity; in that the thrust decrease is proportional to the continuing increase in altitude because of decreasing air density. In addition, in regard to the propeller type rotor airfoil assemblage depicted in FIG. 7 and FIG. 7A, after the forward air speed of the aircraft exceeds three fourths of the rotational velocity of the depicted propeller blade tips, a great deal of the usefulness of the oncoming ram air encountered in flight by the propeller assemblage is lost because so much of this air then passes between the propeller blades without contact therewith as visualized in FIG. 7; and without accomplishing any useful purpose. This explains why the thrust efficiency of a turboprop engine declines abruptly after 450 m.p.h. airspeed is exceeded; and reveals why it can be desirable to increase relative rotor airfoil velocity during flight, as visualized in FIG. 7A.

As contemplated in my invention, the method and means for increasing the relative velocity of rotor airfoils as forward airspeed increases is not limited to variable speed gear train driving mechanisms. Rotor airfoils of the diffusion-compression system of an aircraft gas turbine engine, for example, may be mechanically attached to the engine drive shaft therefor by both clutch means and bearing journal means; so that when a selected clutch means is released a rotor airfoil stage, or a row of rotor airfoil blades, will rotate freely at a rotational velocity determined by the ram air speed and momentum of the mass airflow passing through the said diffusion-compression system as forward airspeed increases. Stator airfoil blades of such diffusion-compression systems may also be attached to the turbine shaft by bearing journal means and be held stationary by clutch or brake band means acting upon their concentric outer shrouds until very high forward airspeeds are attained; after which such stator airfoil would be released to rotate freely in the opposite direction from the direction of rotation of the rotor airfoils of the same diffusion compression system. The object sought, of course, being a mechanical compromise in which some advantages of both ramjet and gas turbine engines are retained while at the same time avoiding disadvantages of both engine types.

Prior to my invention it had been authoritatively concluded that efforts to utilize oxygen booster systems for operating aircraft at altitudes and speeds above and beyond their normal operational ranges, under circumstances involving flights of substantially extended duration, were impractical. Reasons given for such conclusions included prohibitively high fuel consumption, prohibitive weight of oxygen booster systems, and dogmatic beliefs that rotor airfoil rotational tip speeds must always be limited to subsonic velocities.

TURBOJET POWERED AIRCRAFT — EXAMPLE I

My inventive success in this area where so many others failed for such a long period of time may well be due to the fact that the many others who failed did so because they tended to oversimplify the problems involved; and were unable to visualize the complex details of the overlapping and interacting aerodynamic forces involved. Because of this complexity, I believe that my invention may best be disclosed and described by the use of examples. Let us assume for example, a hypothetical fighter type aircraft powered by a 17,000 lb. thrust turbojet engine with fully variable supersonic nozzle type afterburner. Let us assume also that the normal operational altitude range of the aircraft, or its altitude of greatest potential energy, is around 35,000 feet and that the said aircraft can attain horizontal airspeeds of Mach 2 or more within the said altitude range. Assume still further that the engine of the aircraft is able to utilize 170 lbs. per second of air mass flow at 8600 r.p.m. and that the inside cross-sectional area of the air inlet into the said engine is 13.6 square feet; so that in generally level flight at around 35,000 feet altitude and approximately 345 m.p.h., the amount of ram air available at the said air inlet entrance would approximate 170 lbs. per second of mass air flow. It follows then that at mach 2 level flight airspeed our hypothetical aircraft will have more than three and one half times the amount of ram air slamming into its engine air inlet entrance that it can use advantageously. Inasmuch as wing lift, at a given angle of attack, varies as the square of the forward velocity of the aircraft, it also follows that our hypothetical aircraft, at 35,000 feet altitude and at a level flight airspeed of mach 2, would also have a great deal more lift than it needs to support itself; and further, because of decreased aerodynamic drag due to decreased air density at the higher altitude, the same amount of thrust that accelerates our hypothetical aircraft to Mach 2 at 35,000 feet altitude also be able to accelerate it to a sufficiently high forward airspeed at 60,000 feet altitude so that the lift and drag of the aircraft is approximately the same at 60,000 feet altitude as at its normal operational altitude of 35,000 feet altitude. The increased forward speed would in turn make ram air amounting to more than 170 lbs. per second of air mass flow available at the entrance of the engine air inlet; so that in generally level flight, at airspeeds of 1400 m.p.h. and higher, the said engine should be provided with more than enough air mass flow for full engine power and thrust at the higher altitude. My description of a hypothetical aircraft is derived from the capabilities of aircraft now operational. It would seem, in view of the foregoing, that such aircraft ought to be able to perform well at the higher altitudes mentioned but such has not heretofore, prior to this invention, been the case.

Many experimental flight tests have heretofore shown that, after attaining supersonic speeds at their normal operational altitudes, such aircraft can readily zoom climb to above 55,000 feet altitude and thereafter engage in extended horizontal flights at the higher altitude. Unfortunately however, such very high altitude flights have tended to be precarious, inefficient and of limited utility because the upward zoom climb greatly reduces forward airspeed. At the greatly reduced airspeed such aircraft require angle of attack altitudes of up to 45° to provide the lift needed to maintain horizontal flight at such altitudes. Under such conditions ram air is in elastic collision with the whole underside surface area of the aircraft so that both induced drag and parasite drag are greatly multiplied, engine thrust is exerted at an angle groosly out of alignment with the aircraft flight path, and engine air mass flow loses momentum as it rebounds off the top inside of the engine air inlet and follows a bent path into the engine. Under such conditions, wherein the aircraft can maintain a horizontal subsonic flight path but cannot accelerate or climb higher, and wherein there is no other option except some sort of downward plunge, the aircraft may, for the purposes of this disclosure, be said to be flying at absolute ceiling. My invention serves to mitigate such flight problems in a surprising and useful manner.

When our hypothetical turbojet powered aircraft is buffeting slowly along in horizontal flight near its absolute ceiling, and therefore cannot accelerate to a higher airspeed, suppose, for example, that we utilize oxygen booster means to assist the said aircraft into high supersonic horizontal flight speed. The higher horizontal airspeed would serve to improve the flight conditions in various ways. The higher airspeed would enable the aircraft to support itself in horizontal flight at a much lower angle of attack; and this will actually tend to decrease aerodynamic drag as horizontal airspeed increases. Also as the aircraft begins to level off, and approaches alignment of its engine air inlet and exhaust thrust nozzle with its horizontal flight path, the effective thrust of its engine increases dramatically; and, under such high airspeed conditions, the ram air effect also tends to substantially increase engine thrust as forward airspeed increases.

TURBOJET POWERED AIRCRAFT — EXAMPLE II

Although it is not feasible to measure directly the effects of the many aerodynamic forces acting upon an aircraft in flight, it is possible to measure their results indirectly in wind tunnel tests. As a simplified example I will cite some wind tunnel tests of a prototype turbojet aircraft that was being developed at the end of World War Two. This prototype had a gross weight of 9,000 lbs, rated static thrust at sea level of 5,000 lbs, wing loading of 40 lbs per square foot, and a required induced drag of more than 500 lbs to provide the necessary lift to support the aircraft in a horizontal flight path.

Sea level wind tunnel tests of the prototype aircraft indicated drag, induced and parasite, of 600 lbs from its take off and during acceleration from 107 mph to 235 mph. On the basis of the sea level tests, computations ($1/\sqrt{\sigma}2.57$) indicated that the velocities corresponding to 600 lb drag at 50,000 feet altitude should be 275 mph and 604 mph respectively. It is normal for the aerodynamic drag of an aircraft, during acceleration in a horizontal flight path at high altitude, to remain constant or even diminish as forward speed increases. The reason for this is that at low speed in thin air a very high (nose up) angle of attack is required to lift and support the aircraft in such a horizontal flight path. For example also, at high angles of attack a great volume of impact air slams against the underneath surfaces of the belly, tail section, and control surfaces of an aircraft so that parasite drag is thereby produced. Then, as the aircraft is being leveled off and accelerated into full forward speed there is therefore no significant drag increase. Parasite drag decreases very rapidly when air begins to flow underneath the belly of an aircraft instead of colliding with its bottom surface. The drag upon such an aircraft in flight does not begin to actually increase as the square of the distance until full forward speed is attained.

Subsequent tests of the same prototype turbojet in a high altitude wind tunnel indicated that its engine thrust at 50,000 feet altitude was 725 to 620 lbs from 0 through 600 mph. The aerodynamic drag upon the aircraft at the said altitude was 600 lbs from 275 mph to 425 mph. The unexpected drag rise at 425 mph was the result of unsuitable wing design; but at that time this sort of sudden drag rise was believed to be the result of a mysterious upper atmospheric effect called the "compressibility" factor. These tests showed that the minimum horizontal speed of the prototype aircraft, at maximum angle of attack and 50,000 feet altitude, was 275 mph; indicating that 50,000 feet was its approximate absolute ceiling. It was found that the said aircraft could reach its absolute ceiling and minimum safe horizontal airspeed thereat of 275 mph, and could then continue in horizontal flight at said speed until its fuel supply was gone, but it could not accelerate significantly under such conditions because the margin between its thrust and drag was too small. If the prototype aircraft had been assisted or boosted into a horizontal speed of 425 mph and a correspondingly suitable angle of attack at the 50,000 feet altitude however it could also have then continued flying at that speed and altitude until its fuel was consumed; the reasons being that the values of RPM, thrust, and draw would have been the same as at the normal horizontal speed of 275 mph at that altitude. Records of those old tests show that, with a more suitable wind design, and with initial booster assistance, in accordance with applicant's invention, the same old prototype aircraft could have flown horizontally at 50,000 feet altitude and 600 mph because the various parameters of RPM, thrust, drag and lift would have been the same as its normal absolute ceiling horizontal speed of 275 mph. At an above normal altitude it is obviously more efficient, with the other essential parameters substantially unchanged, to fly an aircraft at a higher rate of speed. The foregoing example is confirmed and documented on pages 314 and 315 of a textbook called "Principles of Aerodynamics" by James H. Dwinnell by reference included herein.

TURBOJET AIRCRAFT COMPONENTS AND OPERATION THEREOF

According to my invention, oxygen booster system assistance would normally be used only at the beginning of a high altitude and/or high speed flight to assist the aircraft in attaining full forward speed; although, if required, such booster assistance could also be utilized intermittently or at reduced energy for extended periods of time. My invention largely obviates the problems of prohibitive fuel consumption and prohibitive weight in regard to the advantageous use of oxygen booster systems; it also largely obviates the problems of transonic vibration and engine overload in increasing the relative rotational velocity of rotor airfoils as forward airspeed increases. I also note that my patent applications have been screened by the Armed Services and that transonic and supersonic rotational velocity rotor airfoils have been produced and successfully tested since that time under government auspices.

Further, according to my invention, means for changing the relative rotational velocity of rotor airfoils are not limited to variable speed drive gear trains or free wheeling rotor airfoil systems but instead can also include manual or automatic control means for overriding the fuel control system engine r.p.m. limiting and governing means; so that the allowable r.p.m. of selected aircraft gas turbine engines can be greatly increased when required. According to my invention it is preferred that the engine turbine be cooled by the introduction of water or some other coolant instead of, or in addition to, the air bleed cooling means currently in use. Further, in regard to the selective bypassing of portions, or all as the case may be, of the burn can or combustion chamber discharge gases around the engine turbine at high altitude and/or high forward airspeed, a preferred embodiment would comprise a concentric cluster of controlled and variable flow volume bypass outlets whose functional principles are roughly equivalent to those of turbosupercharger waste gate bypass systems; except that turbosupercharger system exhaust turbine bypass gases are rarely used to produce thrust.

In as much as my invention, in part, utilizes elements of old combinations to produce inventive advance in the art, it may well be helpful in fully disclosing said invention to outline some of the concepts and functional principles whereby the new and useful results are obtained. For example, at normal cruising altitude, or normal altitude, and at supersonic speeds the current technology of jet engines are unable to utilize their full potential thrust because of r.p.m. and temperature limitations of engine gas turbines. For example, at supersonic speeds when compressor rotor airfoil blades are windmilling and the torque load on the turbine is reduced, more hot air and combustion product gases tend to flow through the turbine than is required to provide power for rotating the compressor airfoils. Under such conditions the turbine will tend to exceed its temperature and r.p.m. limitation, and the fuel control system will therefore compensate by reducing fuel input into the engine power section combustion chambers. Limiting the amount of fuel flow into combustion chambers will tend to limit turbine temperature and r.p.m., but it also has the disadvantage of thereby limiting engine thrust under such conditions. Under like conditions on the other hand, if a variable flow control bypass system is used to divert selected portions of the combustion chamber discharge gases around instead of through the engine turbine, we can thereby reduce turbine temperature to a much lower level without any drastic reduction in potential thrust available at the engine exhaust nozzle; the degree of said temperature reduction being subject to the effectiveness of the engine turbine cooling system. In addition, if engine turbine temperature is greatly reduced, then turbine rotor airfoil rotational speed can be increased proportionately without prohibitive damage to the turbine. Such a controllable bypass system can function as a variable speed drive means, in that control variations in bypass gas volume can be utilized to vary the rotational speed of the engine drive shaft. The thrust advantages of such a system are subject to the pressure and temperature limitations, and cooling requirements, of engine combustion chamber and exhaust nozzle walls.

At normal operating altitudes and extremely high airspeeds a viscous cushion of compressed air accumulates in the ram air inlet of a turbojet engine at the front of its forward compressor stage rotor airfoils. This persistent cushion of compressed air reduces the benefits of the windmill effect and tends to increase the potential aerodynamic drag on compressor rotor airfoils. The variable geometry ram air inlets tend to mitigate this problem without solving it. Stepping up the gear ratios and relative rotational speed of compressor airfoils, under such circumstances, is a dramatic step toward a complete solution of the problem. As speeded up compressor rotor airfoils dissipate the cushion of accumulated ram pressure in the jet engine air induction inlet the drag on the said compressor rotor airfoils decreases correspondingly; and any resulting excess volume of mass airflow can be selectively bypassed around the engine turbine or discharged through suitable conventional type air bleed ports.

My invention also utilizes the functional principles of diffusion and synergy in achieving new and useful results. Diffusion is the process by which the kinetic energy of inlet ram air is transferred into static pressure while losing very little of its acquired potential energy. After further compression and the addition of thermal energy by combustion, the energy of the said air is again transformed, by diffusion, into kinetic energy for driving the turbine and for providing reaction mass and thrust at the engine exhaust nozzle. Less than 10% of the original momentum or kinetic energy of engine air inlet ram air is wasted in the course of its diffusion transformations as it passes through a well designed gas turbine engine.

The phenomenon of synergy relates to the functional principle whereby the thrust efficiency of the gas jet exiting from the exhaust nozzle of a jet propelled airborne vehicle tends to increase as its speed and momentum increase. For example as nearly everyone will recall, it seems to take just about as long for an Apollo rocket to lift off its pad and reach an altitude of 100 feet as it required to ascend from 100 feet to 5,000 feet; and the declining fuel weight was not nearly sufficient to account for the overwhelming increase in thrust efficiency as momentum accumulated.

It is to be understood that many variations of the descriptive examples cited herein may be resorted to without departing from the substance of my invention and the scope of the appended claims.

It is to be understood that the various procedures described herein may be performed either manually or automatically; and that in cases wherein a device relating to this invention admits of a conventional control system, it will have a suitable control means; such a control system can, of course, be manual, variable, selective, and/or automatic as may be advantageous or required in the practice of my invention.

In the practice of this invention it is also assumed that, where and when practical, advantageous use will be made of every technical advance that is pertinent and available. Such devices, for example, can include conventional afterburners, wide blade rotor airfoils, super-critical airfoils, airfoils with cusped trailing edges, variable engine air inlets, variable throat exhaust nozzles, and the like. Such advances include the variable "swing wing" design of the F-111 aircraft.

What is claimed is:

1. In a flight method for improving the performance of an aircraft powered by an air breathing engine, the thrust of which is dependent during flight upon the function of rotating airfoils appurtenant thereto; the said aircraft and engine being adapted for and provided with suitable means for the utilization of oxygen booster system assistance; and the said aircraft and engine being adapted for and provided with suitable means for the effective intake and utilization of mass flow air; the steps comprising
    elevating the aircraft to an above normal altitude;
        placing the aircraft in a flight attitude suitable for forward acceleration at the above normal altitude;
        accelerating the aircraft to full forward speed at the above normal altitude;
    performing at least one step, included in said steps of elevating the aircraft to an above normal altitude and accelerating the aircraft to full forward speed, with assistance from an oxygen booster system;
    whereby one functional advantage of the said method is that such an aircraft can thereby be enabled to attain unassisted and significantly prolonged flight, at an above normal altitude, at a higher forward speed and at a lower angle of attack than it could have attained by the use of standard and conventional flight methods.

2. A flight method as set forth in claim 1
    in which said step of accelerating the aircraft to full forward speed at the above normal altitude is accomplished with the assistance of an oxygen booster system.

3. A flight method as set forth in claim 1
    in which more than one of the steps of said method, included in said steps of elevating said aircraft to an above normal altitude and accelerating the aircraft to full forward speed, are accomplished with the assistance of an oxygen booster system.

4. A method as set forth in claim 1
    wherein the engine is a jet engine; said jet engine including compressor rotating rotor airfoils; and wherein the aircraft engine is adapted for and provided with suitable variable speed drive means for controlling the relative rotational speeds of its rotor airfoils;
    including the step of increasing the rotational speed of compressor rotating rotor airfoils of the aircraft engine, relative to the engine turbine rpm, by means of the said variable speed drive mechanism, at the above normal altitude, to compensate for the reduced efficiency of said rotating airfoils due to the decreased air density at the above normal altitude.

5. A method as set forth in claim 1
    wherein the engine of the said aircraft drives a propeller; and wherein the aircraft is adapted for and provided with suitable variable speed drive means for controlling the relative rotational speed of its rotor airfoils;
    including the step of increasing the rotational speed of the said propeller relative to the rotational speed of the basic engine drive means for transmitting torque to the propeller, at the above normal altitude, to compensate for the reduced efficiency of said rotating airfoils due to the decreased air density at the above normal altitude.

6. In a method for improving the performance of an aircraft powered by an air breathing engine, the thrust of which during flight is dependent upon the function of rotating airscrew type rotor airfoils appurtenant thereto; wherein the said aircraft and engine combination is adapted for and includes variable speed drive means for controling and varying the relative rotational speeds of rotor airfoils of said aircraft and engine combination;

wherein said engine includes a turbosupercharger; wherein the said turbosupercharger includes an engine exhaust turbine, inertial rotary means for storing and maintaining rotational momentum of the exhaust turbine, and an engine air intake rotor compressor for augmentation of the air supply to the engine; and wherein the said turbosupercharger is adapted for and provided with suitable variable speed drive means for controlng and varying the relative rotational speeds of its rotor airfoils; the steps comprising elevating the aircraft to an above normal altitude; accelerating the aircraft to full forward speed at the above normal altitude; and including the step of increasing the rotational speeds of rotor airfoils of the turbosupercharger rotor compressor, relative to the rotational speed of the turbosupercharger exhaust turbine, at the above normal altitude, to compensate for the reduced efficiency of said rotating airfoils due to the decreased air density at the above normal altitude.

7. A flight method as set forth in claim 1
in which said step of elevating the aircraft to an above normal altitude, is accomplished with the assistance of an oxygen booster system.

8. In a flight method for improving the performance of an aircraft powered by an air breathing engine, the thrust of which is dependent during flight upon the function of rotating rotor airfoils appurtenant thereto; the said aircraft and engine being adapted for and provided with controllable variable speed drive rotary power transmission means for varying the rotational speed of rotor airfoils of the said aircraft and engine relative to the rotational speed of the engine driving means for said rotor airfoils; the steps comprising elevating the aircraft to a desired altitude; placing the aircraft in a flight attitude suitable for forward acceleration at the desired altitude; accelerating the aircraft to full forward speed at the desired altitude;

and at the full forward speed, utilizing the said controllable variable speed drive means to increase the rotational speed of rotor airfoils of the said aircraft and engine relative to the rotational speed of said engine driving means therefore;

whereby the said aircraft is enabled to utilize more of its available engine power at high forward speed to produce thrust.

9. In a flight method for improving the performance of an aircraft powered by an air breathing engine, the thrust of which is dependent during flight upon the function of rotating rotor airfoils appurtenant thereto; the said aircraft and engine being adapted for and provided with controllable variable speed drive rotary power transmission means for varying the rotational speed of rotor airfoils of the said aircraft and engine relative to the rotational speed of the engine driving means for said rotor airfoils; and said aircraft and engine being adapted for and provided with suitable means for the utilization of oxygen booster system assistance; the steps comprising elevating the aircraft to a desired altitude; placing the aircraft in a flight attitude suitable for forward acceleration at the desired altitude; accelerating the aircraft to full forward speed at the desired altitude;

and at the full forward speed, utilizing the said controllable variable speed drive means to increase the rotational speed of rotor airfoils of the said aircraft and engine relative to the rotational speed of said engine driving means therefore;

wherein at least one of the steps of said method is performed with the assistance of an oxygen booster system;

whereby the said aircraft is enabled to utilize more of its available engine power at high forward speed to produce thrust;

whereby also the said aircraft is enabled to utilize more of its potential engine power at above normal altitudes to produce thrust.

10. In an aircraft powered by an air breathing engine, the thrust of which is dependent during flight upon the function of rotating rotor airfoils appurtenant thereto, means for improving the flight performance of said aircraft and said engine comprising, in operative combination driving means of the said engine for providing rotary power to rotor airfoils of said engine;

interconnecting controllable variable speed drive transmission means for transmitting rotary power from said engine driving means to the said rotor airfoils;

and means for compensating for the momentary torque overload caused by the use of the said variable speed drive transmission means in stepping up the rotational speed of the said rotor airfoils relative to the rotational speed of the said engine driving means therefor;

whereby one function of the said combination is to enable the said aircraft to utilize more of its available engine power for producing thrust at very high forward flight speed; and whereby another function of said combination is to enable such an aircraft to utilize more of its potential engine power at above normal altitude to produce additional thrust.

11. A flight means comprising an aircraft and air breathing engine as set forth and described in claim 10
wherein the said aircraft and engine are adapted for and provided with suitable means for the utilization of oxygen booster system assistance.

12. A flight means comprising an aircraft and air breathing engine as set forth and described in claim 10
wherein the said means for compensating for the momentary torque overload, caused by the use of the said variable speed drive transmission means in stepping up the rotational speed of said rotor airfoils, relative to the rotational speed of the said engine driving means therefor, includes an oxygen booster system.

13. A flight means comprising an aircraft and air breathing engine as set forth in claim 10
wherein the said means for compensating for the momentary torque overload, caused by the use of the said variable speed drive transmission means in stepping up the rotational speed of said rotor airfoils, relative to the rotational speed of the said engine driving means therefor, includes a rotary booster system.

14. A flight means comprising an aircraft and engine as set forth in claim 10
wherein the said means for compensating for the momentary torque overload, caused by the use of the said variable speed drive transmission means in stepping up the rotational speed of said rotor airfoils, relative to the rotational speed of the said engine driving means therefor, includes a disconnectable clutch means having a first mating element for rotating with the power output drive rotor of the said variable speed drive transmission means and a second mating element for rotating with said rotor airfoil.

15. In an aircraft powered by an air breathing engine, the thrust of which is dependent during flight upon the function of rotating rotor airfoils appurtenant thereto; and wherein said air breathing engine includes an exhaust driven turbine; means for improving the flight performance of said aircraft and engine comprising, in operative combination said exhaust driven turbine; interconnecting controllable variable speed drive transmission means for transmitting rotary power from said turbine to rotor airfoils of the said engine; said rotor airfoils of sid engine;

and means included in said aircraft and engine for compensating for the momentary torque overload imposed upon said engine during use of the said variable speed drive means to step up the speed ratio of said rotor airfoils relative to the rotational speed of the said exhaust driven turbine;

whereby one function of said combination is to improve the performance of the said aircraft at very high forward speeds; and whereby another function of the said combination is to improve the performance of said aircraft at an above normal altitude.

16. In an aircraft flight means as described and set forth in claim 15 rotary inertial energy storage means in combination with the said exhaust driven turbine for driving the said variable speed drive means, and thereby, the said rotor airfoils;

a function of the aforesaid rotary inertial energy storage means being to mitigate the effects of momentary torque overload that may be imposed upon said exhaust driven turbine.

17. In an aircraft powered by a gas turbine jet engine, the thrust of which is dependent during flight upon the function of rotating rotor airfoils appurtenant thereto; means for improving the flight performance of said aircraft and engine comprising, in operative combination combustion chamber means of the said engine; gas turbine means of the said engine; suitable variable flow volume bypass means, conduit means, and control means, for causing selected portions of the hot gases exiting from said engine combustion chamber means to bypass the said turbine means instead of passing through said turbine means;

a primary function of said turbine bypass means being to mitigate rotor airfoil drag, and internal engine pressure, overload effects during rapid acceleration of the rotational speed of the rotor airfoils of said engine;

another function of said turbine bypass means being to mitigate the tendency of said turbine means of said engine to overheat during prolonged full throttle operation of said engine.

18. In an aircraft flight means as described and set forth in claim 17

In operative combination therein, the said turbine; interconnecting controlable variable speed drive transmission means for transmitting rotary power from the said turbine to rotor airfoils of the said engine; and means, in addition to the said turbine bypass means, for compensating for the momentary torque overloads imposed upon said engine during use of said variable speed drive means to step up the speed ratio of said rotor airfoils relative to the rotational speed of the engine driving means therefor.

19. In a flight means for improving the performance of an aircraft powered by an air breathing engine, the thrust of which is dependent during flight upon the function of rotating rotor airfoils appurtenant thereto; and said aircraft having an after burner; an oxygen booster system comprising in operative combination, oxident storage means carried by said aircraft; controllable means for moving said oxident from the said storage means to said afterburner at a selected flow rate; controllable means for injecting selected quantities of said oxident into the combustion mixture of said afterburner; and controllable means for shutting off the supply of said oxident to said afterburner.

20. In a flight means for improving the performance of an aircraft powered by an air breathing engine, the thrust of which is dependent during flight upon the function of rotating rotor airfoils appurtenant thereto; and the said aircraft and engine being adapted for and provided with suitable means for accepting booster system assistance from a booster aircraft; the improvements comprising an oxygen booster system comprising a booster aircraft; said booster aircraft being adapted for and provided with suitable oxygen booster system propulsion means; said booster aircraft being also adapted for and provided with suitable attachments for boosting the said aircraft powered by said air breathing engine; and the said booster aircraft attachment means being suitably adapted for attaching the said booster aircraft to, and detaching the said booster aircraft from, the said adapted aircraft.

21. In a flight means for improving the performance of an aircraft powered by an air breathing engine, the thrust of which is dependent during flight upon the function of rotating rotor airfoils appurtenant thereto; the improvements comprising suitable attachment means included in and carried by said aircraft for accepting in-flight oxygen booster system assistance from a separate booster aircraft during flight; the said attachment means being suitably adapted for attachment to and disengagement of said first named aircraft from the said booster aircraft when desired;

whereby a primary function of the said improvements is to make oxygen booster assistance available to an aircraft without loading any additional weight upon the said aircraft; and whereby another function of said improvements would be to make rescue type booster assistance available to the said aircraft should it become disabled.

22. In a flight means for improving the performance of an aircraft powered by an air breathing engine, the thrust of which is dependent during flight upon the function of rotating rotor airfoils appurtenant thereto; said air breathing engine having a propeller for providing thrust for the said aircraft; and the said aircraft and engine having ram air inlet means for the effective intake and utilization of mass flow air; the improvements comprising in operative combination the said propeller; the said ram air inlet means; wherein the said ram air inlet means is mounted, positioned, and aligned, relative to said propeller so that the more energetic propeller air blast flow, produced within and adjacent to the periphery of the rotational radius of the said propeller, is driven rearward into the said ram air inlet means;

whereby the available air flow to the said ram inlet means is significantly augmented.

23. A flight means as set forth in claim 22 wherein the said air breathing engine is adapted for and provided with suitable interconnecting variable speed drive means for varying the rotational speed of said propeller relative to the rotational speed of the driving means therefor.

24. In a flight means for improving the performance of an aircraft powered by an air breathing engine, the thrust of which during flight is dependent upon the function of rotating rotor airfoils appurtenant thereto; and the said aircraft engine being adapted for and provided with turbosupercharger means; the improvements comprising ram air inlet means for said turbosupercharger; said ram air inlet means being suitably adapted, and suitably aligned and mounted upon said aircraft and engine, for providing effective intake and utilization by the said air breathing engine of mass flow air;

whereby the utility of said turbosupercharger is augmenting the air flow into said air breathing engine is correspondingly enhanced.

25. An aircraft as set forth and described in claim 24 the said turbosupercharger of said aircraft having air screw type rotor airfoils, in combination with the ram air inlet means of said turbosupercharger, for the induction of a converging mass flow of air into the engine of said aircraft.

26. An aircraft as set forth and described in claim 24 the said ram inlet of the turbosupercharger of the said aircraft and engine including closure means, in combination with control means therefor, for selective and variable induction of mass flow air into said engine.

* * * * *